United States Patent [19]
Peot et al.

[11] Patent Number: 5,907,207
[45] Date of Patent: May 25, 1999

[54] CONSTANT FORCE BRUSH SPRING ARRANGEMENT FOR ELECTRIC MOTOR

[75] Inventors: David Peot, Easley; Weldon Clark, Liberty, both of S.C.

[73] Assignee: Ryobi, Ryobi North America, Inc., Easley, S.C.

[21] Appl. No.: 08/966,151

[22] Filed: Nov. 7, 1997

[51] Int. Cl.⁶ ................................................. H02K 13/00
[52] U.S. Cl. ...................... 310/245; 310/239; 310/244; 310/242; 310/246
[58] Field of Search ................................. 310/239, 242, 310/244, 246, 247, 91, 245

[56] References Cited

U.S. PATENT DOCUMENTS

| | | | |
|---|---|---|---|
| 4,163,167 | 7/1979 | Zelt et al. | 310/242 |
| 4,559,465 | 12/1985 | Gagneux | 310/242 |
| 4,595,851 | 6/1986 | Houben et al. | 310/246 |
| 4,638,203 | 1/1987 | Maki et al. | 310/239 |
| 5,053,665 | 10/1991 | Yamaguchi et al. | 310/239 |
| 5,227,950 | 7/1993 | Twerdochlib | 310/221 |
| 5,373,210 | 12/1994 | Bear et al. | 310/247 |

*Primary Examiner*—Thomas M. Dougherty
*Assistant Examiner*—Tran N. Nguyen
*Attorney, Agent, or Firm*—Hardaway Law Firm, P.A.

[57] ABSTRACT

The present invention offers a commutation assembly for an electrical motor, whereby a constant optimal pressure is maintained upon the commutator of the motor. This is accomplished by a commutation assembly comprising a torsion brush spring apparatus situated adjacent to a brush unit, the torsion brush spring apparatus generally comprising a spring element with a first end, a coiled center section, and a second end; the spring element having its coiled center section encircling and pivoting about a projection from the motor plate, the projection placed a certain distance D1 from the brush center line and a distance D2 above the lower edge of the brush; a first end extending towards the upper edge of the brush unit and applying a certain force Fx on the upper edge of the brush; and a second end abutting a portion of the motor casing; the brush unit generally comprising a brush having an upper edge in contact with the first end of the spring element and a lower edge in contact with the commutator; the brush unit also comprising a brush holder having a first exterior wall, a second exterior wall, a stop, an end and an aperture; wherein the brush holder, which is situated above the commutator allowing the brush to move longitudinally within the aperture to make contact with the commutator, provides a constant optimal pressure against the commutator due to the constant resulting force applied by the spring element on the brush.

16 Claims, 3 Drawing Sheets

CONSTANT FORCE BRUSH SPRING ARRANGEMENT FOR ELECTRIC MOTOR

FIELD OF THE INVENTION

The present invention relates generally to the art of producing current in electric motors and more particularly to a commutation assembly of an electrical motor which is designed to provide prolonged and improved brush life.

BACKGROUND OF THE INVENTION

The most important factor, and the one on which the success or failure of a DC motor and commutator-type AC motor depends, is commutation. In simple terms, commutation is achieved by the rotation of the commutator in contact with fixed brushes resulting in the movement of current into the coils of the motor armature. Satisfactory commutation means operating under reasonable conditions without excessive sparking, burning of the commutator brushes, or other conditions requiring excessive maintenance.

The conventional brush spring design operates over a range of pressures. In the conventional design, brush pressure against the commutator is at a maximum at the beginning of brush life. If this maximum pressure is too strong, sparking in the motor and/or burning of the brushes may occur accelerating mechanical brush wear. As brush material is worn away and transferred to the commutator by friction between the commutator and the brushes, the initial contact points are worn away and the brush begins to conform to the curvature of the commutator surface. As the brush continues to wear down, however, the pressure applied by the brush on the commutator decreases. At low pressures, the motor may experience electrical loses or intermittent contact due to the poor contact between the brush and commutator. As a result of this decreasing pressure, electrical brush wear is prematurely accelerated.

PRIOR ART

U.S. Pat. No. 5,295,033, issued to Ibaraki on Mar. 15, 1994, discloses the maintaining of a constant force between a brush and a rotary device. Specifically, Ibaraki illustrates a rotary drum device having a guide portion along which a brush unit can move such that a substantially constant force can be maintained between a brush at the contacting point with the rotary portion of the device. Ibaraki relates to the rotating portion of a VTR. This configuration, with moving brush holder portions, however, is not suitable for high speed motors.

U.S. Pat. No. 5,053,665, issued to Yamaguchi et. al. on Oct. 1, 1991, discloses a retaining structure for the brush spring of an electric motor. Yamaguchi, however, is merely concerned with the manner in which the brush spring is mounted.

U.S. Pat. No. 4,990,811, issued to Nakata et. al. on Feb. 5, 1991, discloses a structure for holding a brush while obtaining a uniform pressing force for the brush. Nakata, however, is concerned with reducing the play of the brush within the holder while obtaining a uniform pressing force.

Accordingly, much room for improvement exists within the art to extend or prolong the brush life of an electric motor.

SUMMARY OF THE INVENTION

It is, thus, an object of this invention to provide a novel commutation assembly which produces prolonged brush life.

It is a further object of this invention to provide a novel commutation assembly which will cause an optimal constant pressure to be applied by a brush unit upon the commutator of an electric motor.

It is also an object of this invention to provide a commutation assembly having a novel configuration where the force applied by the spring element and the distance of the projection from the center of the brush produces a constant resulting force by the spring element on the brush and, thus, an optimal constant pressure on the commutator.

It is an additional object of this invention to provide a commutation assembly having a novel configuration which will prolong the life of motor brushes, minimizing mechanical and electrical wear.

These, as well as other objects, are accomplished by a commutation assembly comprising a torsion brush spring apparatus situated adjacent to a brush unit, the torsion brush spring apparatus generally comprising a spring element with a first end, a coiled center section, and a second end; the spring element having its coiled center section encircling and pivoting about a projection from the motor plate, the projection placed a certain distance D1 from the brush center line and a distance D2 above the lower edge of the brush; a first end extending towards the upper edge of the brush unit and applying a certain force Fx on the upper edge of the brush; and a second end abutting a portion of the motor casing; the brush unit generally comprising a brush having an upper edge in contact with the first end of the spring element and a lower edge in contact with the commutator; the brush unit also comprising a brush holder having a first exterior wall, a second exterior wall, a front exterior wall, a back exterior wall, a stop, an end and an aperture; wherein the brush holder, which is situated above the commutator allowing the brush to move longitudinally within the aperture to make contact with the commutator, provides a constant pressure against the commutator due to the constant resulting force applied on the brush by the torsion brush spring apparatus, minimizing electrical and mechanical brush wear. When an optimal constant pressure is achieved, mechanical brush wear is approximately equal to electrical brush wear.

DETAILED DESCRIPTION

In accordance with this invention, it has been found that a novel apparatus may be provided for the maintaining of a constant optimal pressure between the brush and the commutator of an electric motor, resulting in longer life for the brush of the electric motor. Various other advantages and features will become apparent from the following description given with reference to the various figures and drawings.

Figure 1:
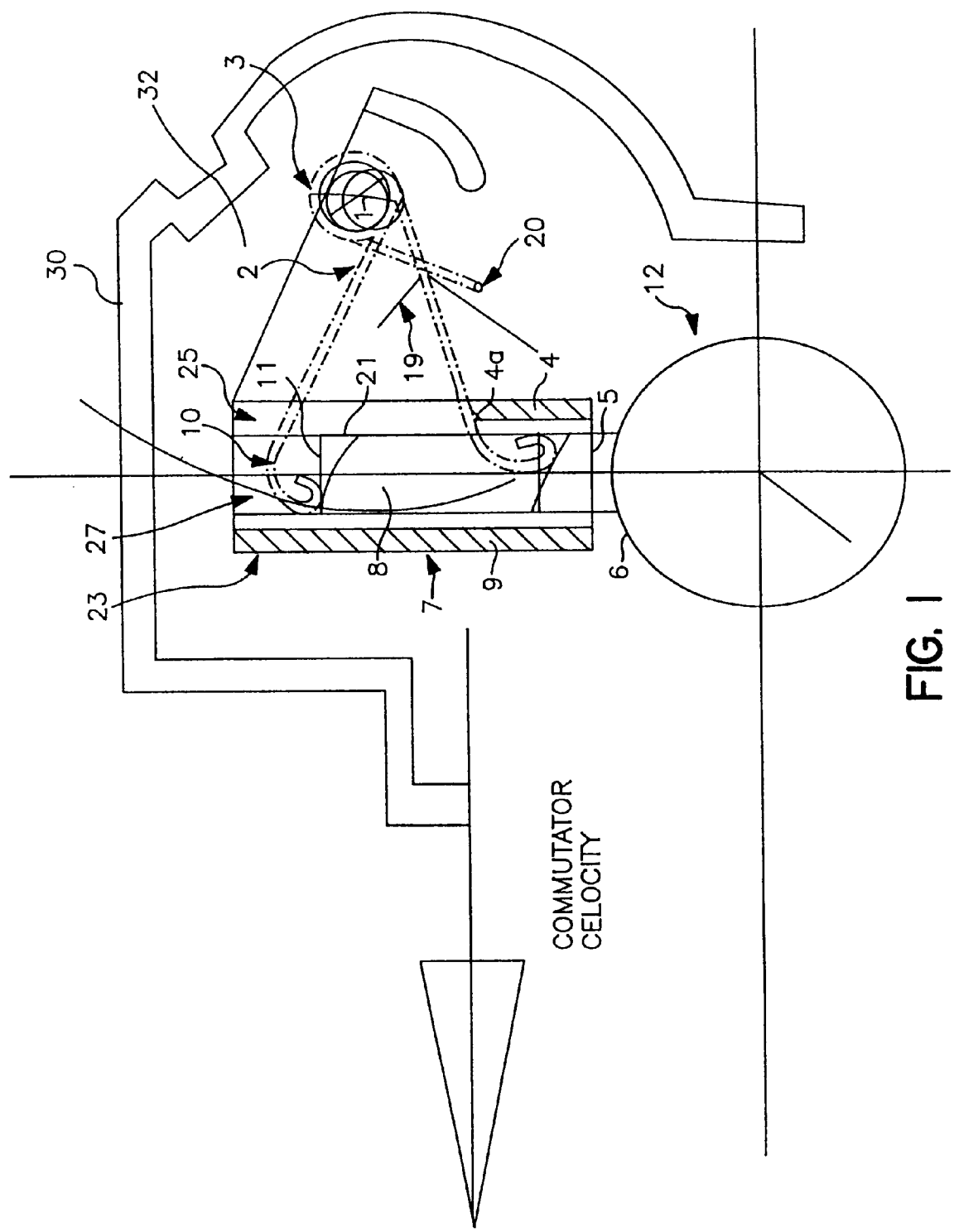
FIG. 1 of the drawings is a plan view of the torsion brush spring apparatus and the brush unit in relation to the commutator.

As seen in FIG. 1, a projection 1, extends from a support plate 32 of an electric motor having a casing 30. Projection 1 acts as a pivot point for the spring element 2 and is preferably integrally formed generally cylindrical, permitting a coiled circular section 3 of a spring element 2 of a torsion brush spring apparatus to encircle and pivot along the exterior thereof. A second end 20 of the spring element 2 abuts an interior portion of the motor casing, usually a stop block 19 affixed to the motor casing (not shown).

Brush holder 7 has an aperture 27 therethrough and an exterior wall 23 forming aperture 27. In a preferred embodiment of the invention, the brush holder 7 is rectangular, having four sides, a first exterior wall 9, a second exterior wall 4, front exterior wall (not shown) and a back exterior wall (not shown). Although a preferred embodiment of the invention is rectangular, the brush holder 7 may be of any shape including cylindrical. Brush 8 seats within aperture 27 and is capable of sliding within aperture 27 along the longitudinal length of brush holder 7. Additionally, the second exterior wall 4 is formed with a notched section 25 which forms a stop 4a on the second exterior wall which prevents further movement of the first end 10 of the spring element 2 when the brush 8 reaches its end of life.

The brush 8 is essential to the completion of the current flow path through the armature (not shown) of the electric motor. In a preferred embodiment, the brush has a notched portion 21 in which the first end 10 of the spring element 2 sits. However, the brush may be of any shape with or without a notched portion. Depending on the current density needed, the brush 8 may be of an electro-graphite material, a graphite material or a metal-graphite material, for example. In any instance, the brush 8, which is seated in the aperture 27 of the brush holder 7, must be held securely to the surface of the commutator 12 by brush holders 7 and spring element 2 in order to achieve the desired performance.

Figure 2:
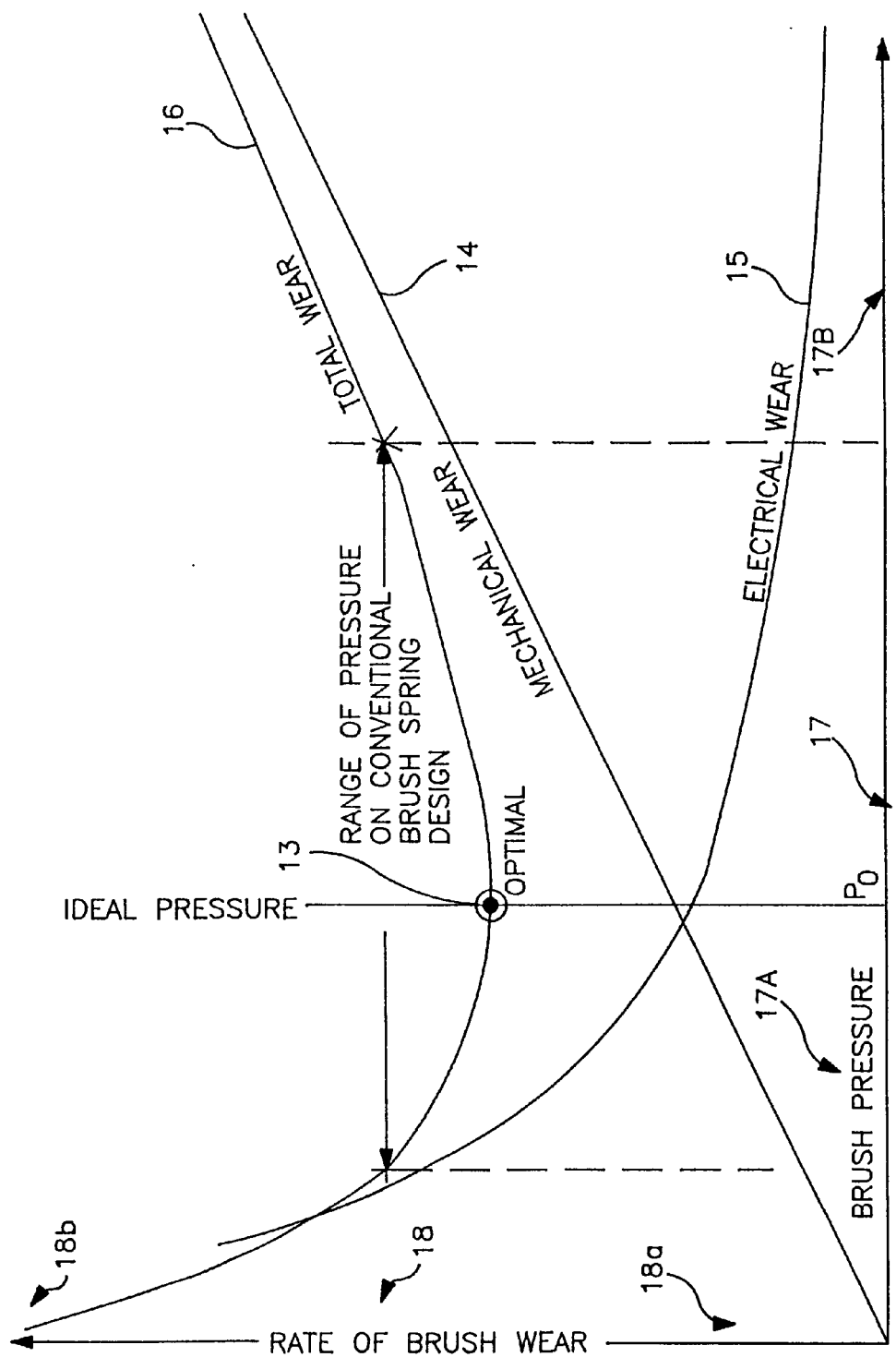
FIG. 2 of the drawings is a representation of the relationship between the rate of brush wear versus the corresponding brush pressure, with the optimal constant pressure to be applied by this invention noted where mechanical and electrical wear are approximately equal.

Referring to FIG. 2, the requisite contact or the optimal constant pressure 13 achieved by this invention is determined when the combined mechanical and electrical wear is at its minimum value. Mechanical brush wear 14 or the actual wearing away of brush material, increases as brush pressure 17 increases. Thus, at high brush pressures 17B, there is a high rate of brush wear 18B. Conversely, at low brush pressures 17A, there is a low rate of brush wear 18A.

Electrical brush wear 15, which is related to the ability of the brush 8 to pass current, has just the opposite response to brush pressure 17 changes. At low brush pressures 17A, there is poor contact between the brush 8 and the commutator 12. Thus, the ability of the brush 8 to pass current is diminished causing high electrical brush wear, as well as poor motor performance. At high brush pressures 17B, however, electrical brush wear 15 is at a minimum due to adequate contact between the brush 8 and the commutator 12.

As FIG. 2 shows, electrical brush wear 15 and mechanical brush wear 14 contribute to the overall rate of brush wear 18 and are a function of brush pressure 17. Thus, the present invention seeks to prolong brush 8 life by applying an ideal pressure which would allow mechanical brush wear 14 and electrical brush wear 15 to be minimized. This ideal pressure, or optimal constant pressure 13, is the minimum point on the total wear 16 curve of FIG. 2, the total wear curve 16 being a summation of the mechanical brush wear 14 line and the electrical brush wear 15 curve.

The spring element 2 is, therefore, essential because spring action is required to hold the brush securely to the surface of the commutator. And as shown is FIG. 3, the force Fx of the spring element 2, the distance D1 of the projection 1 from the brush and the distance D2 of the projection above the lower edge 5 of the brush 8 are configured such that a resulting force Rx is produced which is constant throughout the life of the brush 8. Distance D1 is measured from a point on the area of the lower edge 5 of brush 8 between the outer edges of the brush 8. The resulting force Rx is a product of the force Fx applied by the first end 10 of the spring element 2 and the cosine of the angle A at which the force Fx is applied. As angle A gets smaller, the actual force applied decreases, however, the resulting force Rx remains constant. Thus, the resulting force Rx is a constant force at any spring position and produces an optimal constant pressure 13 between the brush 8 and the commutator 12 which, likewise, remains constant throughout the life of the brush.

Figure 3:
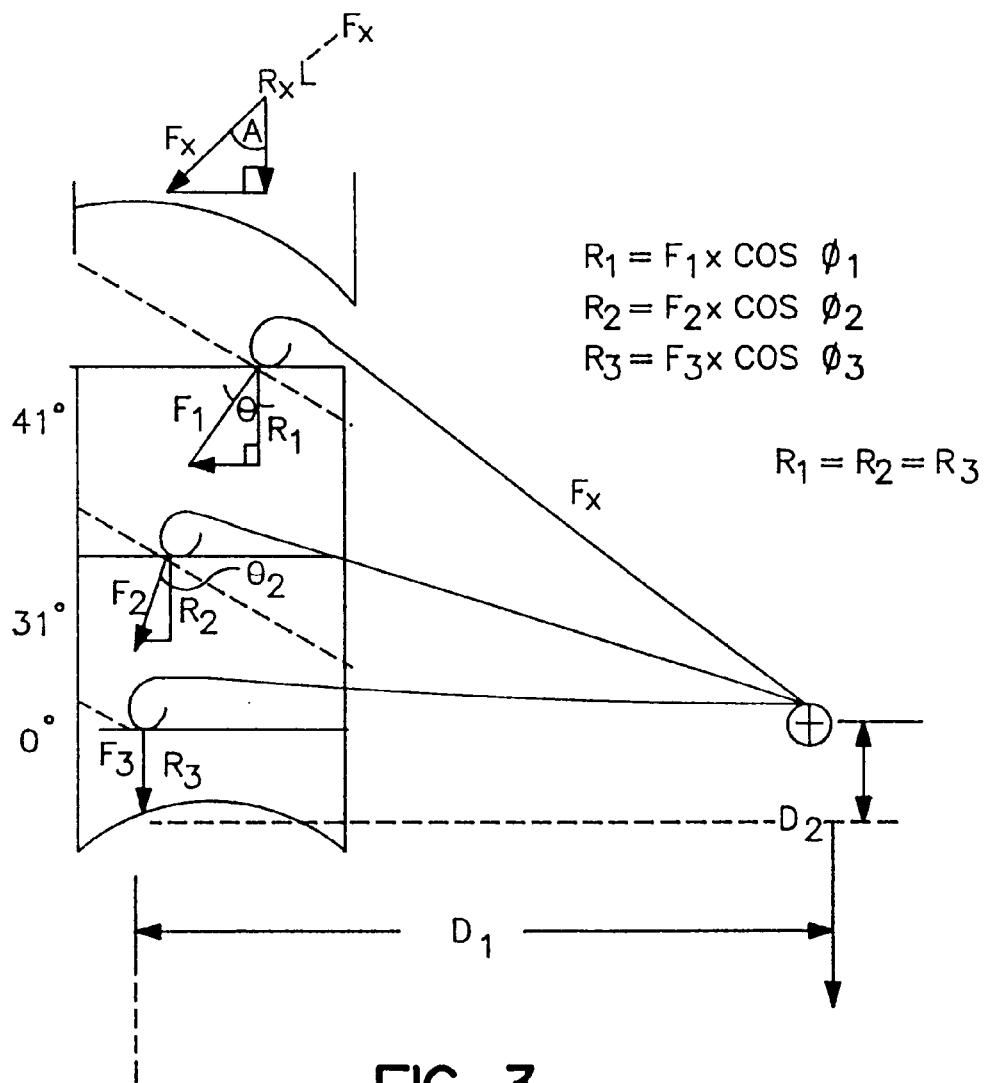
FIG. 3 is a representation of the relationship between the location of the projection, the force applied by the spring and the resulting forces produced.

As FIG. 3 illustrates, as the first end 10 of the spring element 2 rests upon the upper edge 11 of the brush 8 at differing positions, resulting forces R1, R2 and R3 for example, are produced. The resulting force Rx at any given position of the spring element 2 is a constant. Once the spring element 2 rests against the stop 4a, the brush 8 has reached the end of its useful life and should be replaced.

Figure 4:
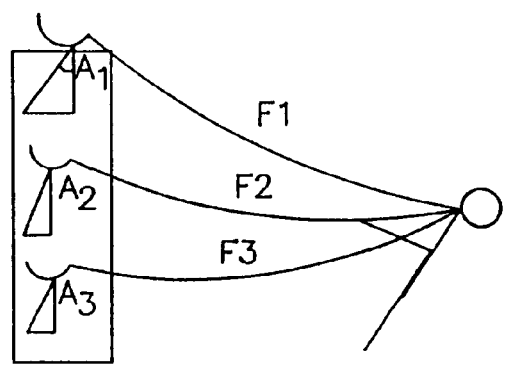
FIG. 4 is a representation of angles at which brush and spring pressure were measured.

To test the invention, several force measurements were made of the spring and brush arrangement, as illustrated in FIG. 4 of the drawings. At a first position $F_1$, having an angle $A_1$ of approximately 43.945°, the spring pressure was measured and found to be 2.5 lbs., while the pressure imparted upon the brush was 1.8 lbs.

The spring and brush pressure were again tested at $F_2$ and a lesser angle $A_2$ of approximately 34.915°, and the spring pressure was found to be 2.2 lbs., while the pressure on the brush remained constant at 1.8 lbs. At position $F_3$ and an even lesser angle $A_3$ of approximately 19.948°, the spring pressure was tested at 1.8 lbs., while the brush pressure fell only slightly to 1.7 lbs. This last measurement was made roughly at the conclusion of the operating life of the brush.

It is thus seen that a novel commutation assembly has been provided. The invention has been described with respect to a particular preferred embodiment thereof. Many variations will undoubtedly become apparent to one skilled in the art upon a reading of the above specification with reference to the drawings. Such variations, however, are within the spirit and scope of the invention as defined by the following appended claims.

That which is claimed:

1. A commutation assembly for the application of a predetermined constant pressure by a brush upon a commutator of an electric motor, said electric motor having a support plate and a casing, said electric motor comprising:

a brush having a lower edge and an upper edge;
  said lower edge being in contact with the commutator of an electric motor; and
  said upper edge opposite said lower edge;
a torsion brush spring apparatus, said torsion brush spring apparatus comprising:
  a projection extending from said support plate of said electric motor wherein said projection is located a distance D1 from said brush and a distance D2 above the lower edge of the brush;
  a spring element comprising a first end, a coiled center section, and a second end; wherein said first end engages said brush and is extended such that a constant resulting force is applied upon said brush;
  said coiled center section encircles said projection; and
  said second end abuts an internal portion of the motor casing; and a brush unit comprising:
: a brush holder having an exterior wall, said exterior wall having a notch therein forming a stop and an aperture therethrough; wherein said stop provides a resting position for said first end of said spring element.

2. The commutation assembly according to claim 1, wherein said brush is slidable within said aperture of said brush holder.

3. The commutation assembly according to claim 1, wherein said brush within said aperture is slidable only longitudinally along said brush holder.

4. The commutation assembly according to claim 1, wherein said brush holder is rectangular in cross section.

5. The commutation assembly according to claim 1, wherein said distance D1 is measured from a center point on said brush and said distance D2 is measured from said lower edge of said brush.

6. The commutation assembly according to claim 1, wherein said brush has a notched upper edge.

7. The commutation assembly according to claim 1, wherein said resulting force is equal at any position of said spring element to a respective resulting force at another position of said spring element, said resulting force being equal to (Fx)*(cosine A) where Fx is a force applied by said spring element on said brush and A is an angle at which said force Fx is applied.

8. A commutation assembly for the application of a predetermined constant pressure by a brush upon a commutator of an electric motor, said electric motor having a support place and a casing, said electric motor comprising:
: a brush having a lower edge and an upper edge;
:: said lower edge being in contact with the commutator of an electric motor; and
:: said upper edge opposite said lower edge;
: a torsion brush spring apparatus having:
:: a projection extending from said support plate of said electric motor wherein said projection is located a distance D1 from said brush and a distance D2 above said lower edge of said brush;
:: a spring element comprising a first end, a coiled center section, and a second end; wherein said first end engages said brush and is extended such that a constant resulting force is applied upon said brush;
:: said coiled center section encircles said projection; and
:: said second end abuts an internal portion of said motor casing.

9. The commutation assembly according to claim 8, wherein said projection is cylindrically shaped and is integral with said support plate.

10. The commutation assembly according to claim 8, wherein said projection acts as a pivot point for said spring element.

11. The commutation assembly according to claim 8, wherein said internal portion of said motor casing is a stop block.

12. The commutation assembly according to claim 8, wherein said resulting force is equal at any position of said spring element to a respective resulting force at another position of said spring element, said resulting force being equal to (Fx)*(cosine A) where Fx is a force applied by said spring element on said brush and A is an angle at which said force Fx is applied.

13. The commutation assembly according to claim 8, wherein said distance D1 is measured from a center point on said brush and said distance D2 is measured from said lower edge of said brush.

14. The commutation assembly according to claim 8, further comprising a brush unit, said brush unit comprising:
: a brush holder having an exterior wall and an aperture therethrough;
:: said exterior wall, having a notched section which forms a stop for restraining said
::: first end of said spring element at a resting position indicating the end of life for said brush.

15. The commutation assembly according to claim 14, wherein said brush holder is rectangular in cross-section.

16. The commutation assembly according to claim 8, wherein said brush has a notched portion along said upper edge.

* * * * *